June 4, 1968     R. W. TREHARNE     3,387,134

WAVELENGTH INDEPENDENT, DIRECT READING RADIOMETER

Filed Jan. 28, 1965

INVENTOR.
RICHARD W. TREHARNE

BY

*Marechal, Biebel, French & Bugg*
ATTORNEYS

United States Patent Office 3,387,134
Patented June 4, 1968

3,387,134
WAVELENGTH INDEPENDENT, DIRECT
READING RADIOMETER
Richard W. Treharne, Xenia, Ohio, assignor to Charles F. Kettering Foundation, Yellow Springs, Ohio, a corporation of Ohio
Filed Jan. 28, 1965, Ser. No. 428,771
8 Claims. (Cl. 250—83.3)

ABSTRACT OF THE DISCLOSURE

A wavelength independent radiant power measuring instrument includes a target disc having a thermistor integrally mounted on one side, and an optically flat black material to receive and absorb incident radiation coated on the other side. The target disc has an area large compared to the thermistor to provide for thermal focusing of the incident radiation. A second or reference thermistor, shielded from the incident radiation, is connected along with the first thermistor in a bridge circuit and compensates the instrument for changes in ambient temperature.

---

Figure 1:
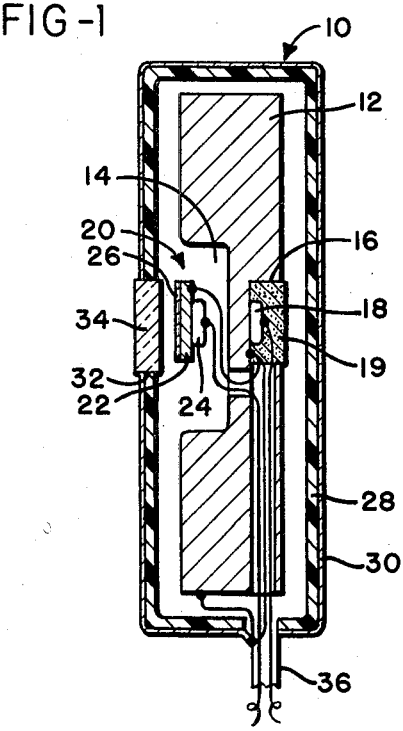

This invention relates to a direct reading wavelength independent radiant power meter which provides true measurements of incident radiant power in the near ultraviolet, visible and infrared range.

In the past thermistors have been used as infrared energy detectors for the measurement of temperature. As remote temperature sensing devices, the wavelength response of the thermistor below one micron generally is not required. However, for incident radiant power measurement, a wavelength response in the near ultraviolet and visible range as well as in the infrared range is often necessary. The radiometer ideally should have a response to radiation independent of the wavelength of the measured energy.

In this invention, wavelength independent response is accomplished by using a thermistor which forms an integral part of a black body bolometer. The black body detector is coated with an optically-flat black material to insure total absorption of radiation in the range from 0.2 micron to more than 40 microns. While many black coatings provide satisfactory radiation absorption in the infrared range, the requirements for detector that senses radiation in the near ultraviolet visible range are more stringent, and therefore, it is essential that the detecting element coating be optically-flat black. In addition, it has been found that a blackened thermistor alone does not provide adequate sensitivity and response for incident radiant power measurements. Accordingly, a novel form of radiant energy sensor, consisting of a target disc covered with an optically flat black coating with a thermistor integrally formed on its black surface, has been developed.

The device of this invention is useful in making radiant power measurements in confined areas which are normally not accessible to conventional radiant energy measuring means. The device is also useful for measuring radiant energy in photochemical, photosynthesis and optics-laser research.

It is a primary object of this invention to provide a radiometer device capable of measuring incident radiant power, independent of wavelength, which gives a substantially constant response in the near ultraviolet, visible and infrared range.

A further object of this invention is to provide a novel device which is capable of measuring incident radiant power in confined areas.

A further object of this invention is to provide a novel radiometer device incorporating thermistors as integral parts of the sensing elements.

Another object of this invention is to provide for a device to measure incident radiation independent of changes in ambient temperature.

Another object of this invention is to provide direct readout measurements of radiant power in practical units without the need for conversion factors or wavelength correction factors.

An additional object of this invention is to provide for means to calibrate the radiometer.

Other objects and advantages of the invention will be apparent from the following description, the accompanying drawings and the appended claims.

Figure 2:
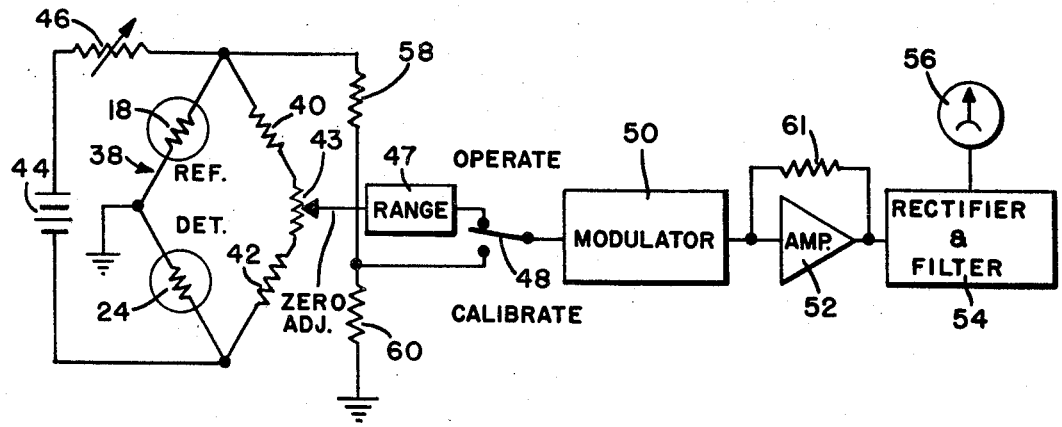

In the drawing:

FIG. 1 is a cutaway view of the probe element containing the radiation detector and sensing elements; and FIG. 2 is a schematic diagram of the radiometer.

Referring now to FIG. 1, the detector 10 consists of a probe 12 constructed of a thermally conductive material such as brass. This probe is massive and acts as a stable thermal reference for the sensing thermistors. Situated on either side of the probe are cavities 14 and 16. The radiation sensing element 20 is mounted in but insulated from the wall of cavity 14. The radiation sensing element 20 consists of a target disc 22, a first heat sensing thermistor 24 mounted as an integral part of and on one side of the disc 22, and a radiation absorbing, optically-flat black material 26 covering the exposed side of the target disc. The target disc 22 may be, for example, a 0.475 cm. diameter by a 0.3 mm. thick copper disc, however, other materials and different dimensions have been successfully employed.

In order to measure incident radiation in the near ultraviolet and visible as well as in the infrared range, the radiation absorbing material 26 is optically-flat black and may be finely divided carbon black. However, the coating material is preferably optically-flat black lacquer such as Krylon (Krylon, Inc.) or Black Velvet Coating (3M Company). With materials such as Krylon, a flat response, within three percent, from at least 0.2 micron to more than 40 microns can be obtained.

The thermistor 24 is formed on the back surface of target disc 22. This insures good thermal and electrical contact between the disc 22 and thermistor 24. The relatively large area of the target disc 22 compared to thermistor 24 tends to focus the incident radiant power from a large area onto the thermistor without the need for optical focusing means. In addition, this particular form of the detector does not require the radiant energy chopping means such as that normally used to improve the signal-to-noise ratio in infrared detectors. These two factors make possible the design of a small probe and consequently permit the measurement of radiant power in confined areas. In one device constructed according to the invention, the physical volume of the active area of probe is less than 0.5 cu. cm. so that light measurement can be made in confined areas such as within a spectrophotometer cuvette or an electron spin resonance spectrometer cavity.

Contained within the second cavity 16 is a reference thermistor 18. Thermistor 18 is mechanically and electrically attached to probe 12. It is surrounded in the cavity by a potting compound 19. This thermistor is therefore an integral part of the brass probe 12 which acts as a stable ambient temperature reference, as can be seen from FIG. 1. Thermistor 18 is shielded by probe 12 from the incident radiant energy so that, in the absence of incident radiant energy, both thermistors 18 and 24 will sense the same ambient temperature environment.

Probe 12 and thermistors 18 and 24 are covered with a clear plastic tubing 28 to provide thermal shielding and minimize ambient thermal gradients. The tubing 28 is in turn entirely covered with a reflective aluminum foil 30 which provides additional thermal shielding as well as electrical shielding. Positioned in the tubing 28 is an opening 32 which exposes the target disc 22 to the radiation to be measured.

Within the opening 32 a window 34 may be placed. For measurements of radiation up to 4 microns, a fused quartz window may be used. For measurements above 4 microns, a different type window, such as $CaF_2$, would be required. Of course, the device could operate with no window in the opening, however, a sealed probe has been found to exhibit better stability than a windowless probe due to ambient thermal gradients. A shielded flexible cable 36 extends from the probe 12, and thermistors 18 and 24 are connected to the associated measuring and indicating circuits through the center leads of cable 36. The probe 12 and aluminum shield 30 are connected to electrical ground through the shielding of cable 36.

The radiometer measuring and indicating circuits is shown in FIG. 2. Thermistors 18 and 24 are connected in conjugate arms of a bridge circuit 38. Resistors 40 and 42 form the other two arms of the bridge circuit. Potentiometer 43 is mounted between resistors 40 and 42 and is used to balance the bridge in the absence of incident radial energy. Since both thermistors 18 and 24 sense the same ambient temperature and environment, the device will automatically compensate for changes in temperature in the normal ambient temperature range due to the arrangement of the bridge circuit. A power supply 44, which may conveniently be in the form of mercury batteries, or a well regulated DC voltage supply such as a Zener diode, supplies the voltage to operate the bridge.

A potentiometer 46 in series with the power supply and the bridge circuit is used to calibrate the instrument. The DC output from the bridge passes through range switch 47 and switch 48 to modulator 50 which converts the DC signal into a proportionate AC carrier in a well known manner. The AC signal is then amplified by amplifier 52. The amplified AC signal is then passed to a rectifier and filter circuit 54. The DC output of the filter circuit drives a meter movement 56 which indicates the amount of radiation sensed by thermistor 24. Since the radiometer is wavelength independent, the meter 56 may be calibrated directly in practical units, such as milliwatts per square centimeter or ergs per square centimeter-second, without the need for conversion factors or wavelength correction factors.

The range of one form of the instrument is between $10^2$ to $10^7$ ergs/cm.$^2$-sec. This range is adequate to permit measurement of weak radiant energy such as from a small grating monochromator and, at the other extreme, the radiometer can be used to measure the output from a medium power, continuous-wave laser such as the helium-neon gaseous type laser.

Since the instrument calibration can be in error if either the bridge supply voltage or the amplifier gain changes, a built in "calibration check" feature assures accurate calibration. In the "calibration check" position of switch 48, a portion of the supply of the bridge supply voltage is fed through the resistors 58 and 60 into the amplifier 50. The meter reading is observed under these conditions. If the reading does not match a pre-set calibrated position on the meter dial, the calibration adjusting potentiometer 46 is turned to recalibrate the instrument. Since the amplifier 52 contains negative feed-back through resistor 61 the effect of changes in amplifier supply voltage are minimized and the instrument will rarely require calibration adjustment.

As described above, a radiometer incorporating thermistor has been constructed to measure incident radiant energy in the range of 0.2 micron to more than 40 microns, which range includes the near ultraviolet, visible and for infrared spectrum. An essentially constant response to incident radiant energy over this entire spectrum, within three percent has been made possible by using an optically-flat black material on the detector element. By making the detector element large with respect to the sensing thermistor, a thermal focusing effect is achieved without the need for optical focusing means. The radiometer is rendered insensitive to ambient temperature changes by balancing, in a bridge circuit, the sensing thermistor changes against a compensating thermistor mounted in a stable thermal reference.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A wavelength independent radiation detector comprising a target element of thermally conductive material, an optically-flat black material covering a first surface of said target element and exposed to incident radiation to absorb the incident radiation totally in the spectrum of radiation including the near ultraviolet, visible and infrared range, and a temperature sensitive element mounted to the second surface of said target element to provide a signal representing the temperature of said target element, said target element having an area large compared to said temperature sensitive element to provide for thermal focusing.

2. A wavelength independent radiation detector comprising, target means, an optically-flat black material on said target means exposed to incident radiation for totally absorbing radiation in the spectrum including the near ultraviolet, visible and infrared range, means attached to said target means for sensing the temperature of said target means as said material absorbs incident radiation, said target means having an area large compared to the attached sensing means to provide for thermal focusing, probe means including means defining an aperture through which all incident radiation passes to said target means encompassing said target means and said sensing means to provide a stable thermal reference, and a second sensing means embedded in said probe means and shielded from the incident radiation to sense the temperature of the ambient environment and to provide for temperature compensation.

3. A wavelength independent radiant power detector comprising, a radiation detector including a target element of thermal conducting material, an optically-flat black material covering a first side of said target element for absorbing incident radiation in the spectrum from the near ultraviolet through the infrared range, a first temperature sensing element mounted on the second side of said target element, said target element having an area large compared to said temperature sensing element to provide for thermal focusing, probe means for providing a stable thermal reference, means mounting said radiation detector in said probe means and exposing said first side of said radiation detector to the radiation to be measured, a second temperature sensitive element mounted in said probe means to provide a temperature reference for said first sensing element, said probe means shielding said second temperature sensitive element from the measured radiation, and electrical leads connecting said first and second temperature sensing elements with measuring and indicating means at a position remote from the detector.

4. A wavelength independent radiant power detector comprising, a radiation detector including a target element of thermal conducting material, an optically-flat black material covering one side of said target element for absorbing radiation at an essentially constant rate from the near ultraviolet through the infrared range, a first temperature sensing element mounted on the opposite side of said target element, probe means for providing a stable thermal reference, means mounting said radiation detector in said probe means and exposing the radiation detector to the radiation to be measured, a second temperature sensitive element mounted in said probe means to provide a temperature reference for said first sensing element, said probe means shielding said second temperature sensitive element from the measured radiation, bridge circuit means electrically connected to said first and second sensing elements, a DC voltage source connected to said bridge circuit means, a variable resistor between two legs of said bridge circuit means to provide for zero adjustment, a modulating means connected to the ouput of said bridge circuit means to convert the DC output of said bridge circuit means to an AC voltage, an AC amplifier connected to said modulating means, and a rectifier and filter circuit connected to the output of said amplifier to provide a DC voltage proportional to the energy impinging on said target element.

5. The apparatus of claim 4 further comprising a calibrating means including a switch connecting the bridge to the modulating means when in the first position and connecting a portion of the supply voltage to the modulating means when in the second position.

6. A wavelength independent radiant power detector comprising, a metallic probe, a thermally insulating tubing covering said probe to provide temperature shielding, a reflective, electrically conductive shield around said tubing to provide both thermal and electrical shielding, a first thermistor mounted in said probe, target means mounted in said probe exposed to incident radiation in thermal conductive relationship to said first thermistor, said target means having an area large compared to said first thermistor to provide for thermal focusing, an optically-flat black radiation absorbing material coated on said target means for totally absorbing incident radiation in the spectrum from the near ultraviolet through the infrared range, a window in said tubing and shield positioned to expose said radiation absorbing material to the radiation to be measured, a second thermistor mounted in said probe and shielded from the incident radiation to be measured, and an electrical conducting means connected to said first and second thermistors and said electrical shield to connect the detector to an indicating means.

7. A wavelength independent radiometer comprising, a target means for absorbing radiation at an essentially constant rate over the near ultraviolet, visible and infrared range, first sensing means attached to the target means for sensing the temperature of the target means, said target means having an area large compared to the sensor means to provide for thermal focusing, a second sensing means to sense the temperature of the ambient environment of the target means, probe means encompassing said target means and both said sensing means, said probe means consisting of a thermally conductive shield providing a stable thermal reference and having first and second cavities therein, said first cavity containing said target means and said first sensing means, said second cavity containing said second sensing means, said probe means shielding said second sensing means from radiation, thermal insulating means surrounding the probe means to minimize ambient thermal gradients, and a window positioned in said first cavity to permit the measured radiant energy to impinge on said target means.

8. A wavelength independent radiant power detector comprising, a metallic probe, a plastic tubing covering said probe to provide temperature shielding, an aluminum foil surrounding said tubing to provide both thermal and electrical shielding, a target element of thermally conductive material mounted in said probe, an optically-flat black material covering a first side of said target element for absorbing radiation at a substantially constant rate of a spectrum of radiation including the near ultraviolet, visible and infrared range, a first thermistor integrally mounted on a second side of said target element in thermal and electrical contact therewith, said target element being large with respect to the first thermistor, a quartz window in said tubing and foil positioned to expose said first side of said target element to the radiation to be measured, a second thermistor to sense the temperature of the ambient environment of the target element integrally mounted on said probe and shielded from the radiation to be measured, and electrical leads connecting said first and second thermistors with measuring and indicating means at a position remote from the probe.

References Cited

UNITED STATES PATENTS

| | | | |
|---|---|---|---|
| 2,587,674 | 3/1952 | Aiken | 250—83.3 |
| 2,981,913 | 4/1961 | Barnes et al. | 338—18 |
| 2,983,888 | 5/1961 | Wormser | 338—18 |
| 3,094,617 | 6/1963 | Humphries et al. | 250—83.3 |
| 3,119,086 | 1/1964 | Dreyfus | 338—18 |
| 3,255,632 | 6/1966 | Brooks | 73—355 |
| 3,267,403 | 8/1966 | Guarnieri | 338—18 |

RALPH G. NILSON, *Primary Examiner.*

S. ELBAUM, *Assistant Examiner.*